United States Patent [19]
Harris et al.

[11] Patent Number: 5,517,949
[45] Date of Patent: May 21, 1996

[54] ANIMAL LEASH WITH SNAP LINK

[76] Inventors: Nancy J. Harris, 3550 S. Harlan No. 231, Denver, Colo. 80235; James A. Harris, 300 E. 16th St., No. 309, Greeley, Colo. 80631

[21] Appl. No.: 369,502

[22] Filed: Jan. 6, 1995

[51] Int. Cl.⁶ .................................................. A01K 27/00
[52] U.S. Cl. .................. 119/795; 24/598.2; 24/599.1
[58] Field of Search .................. 119/770, 792, 119/795, 797; 24/132 R, 598.2, 599.1, 599.4, 599.6, 599.7; 54/34

[56] References Cited

U.S. PATENT DOCUMENTS

| | | |
|---|---|---|
| 76,517 | 4/1868 | Pelton . |
| 596,215 | 12/1897 | Moritz . |
| 606,997 | 7/1898 | Mehl . |
| 1,187,289 | 6/1916 | Ebersole . |
| 2,098,466 | 11/1937 | Rodenbach .............................. 24/234 |
| 2,281,655 | 5/1942 | Zippay ..................................... 24/599.7 |
| 2,551,564 | 5/1951 | Marien ................................. 24/598.2 X |
| 4,095,316 | 6/1978 | Gabriel ......................................... 24/234 |
| 4,811,467 | 3/1989 | Lowe ................................... 24/598.2 X |
| 4,819,304 | 4/1989 | Engers ..................................... 24/598.2 |
| 4,835,823 | 6/1989 | Contat ................................ 24/598.2 X |
| 5,210,914 | 5/1993 | Katsma ................................... 24/573.5 |
| 5,361,726 | 11/1994 | Harris et al. ............................. 119/797 |

*Primary Examiner*—Robert P. Swiatek

[57] ABSTRACT

A simple, strong, and durable animal leash, comprising two elements. The first element is a lead formed of strap material. The second element is a snap link, which is a relatively large link made of aluminum, one side of which is a gate which can pivot inward so as to open the snap link and permit its attachment to a collar or halter. The large open area of the snap link makes it a versatile attachment device which is easy to manipulate. The leash may be attached and used in a multiplicity of ways, and the various sizes of the leash span a wide spectrum of uses.

12 Claims, 3 Drawing Sheets

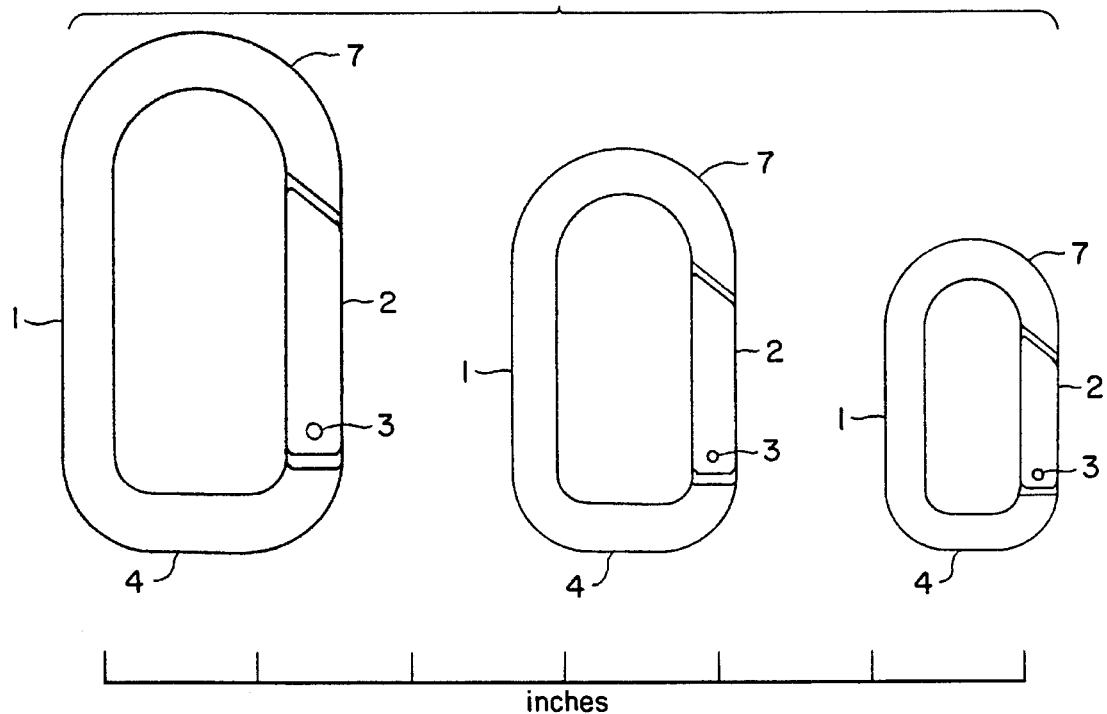
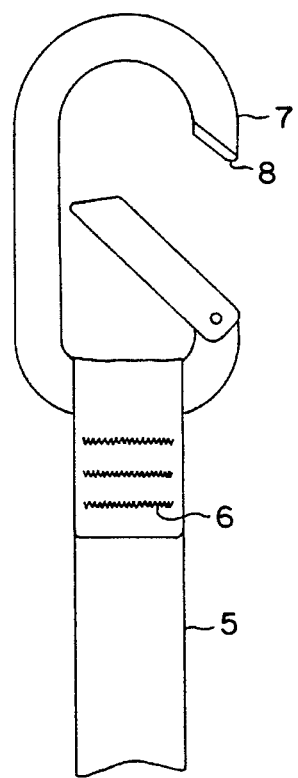
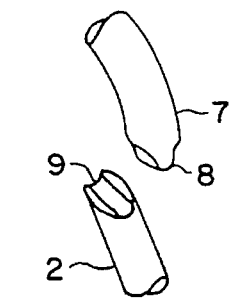

ANIMAL LEASH WITH SNAP LINK

BACKGROUND OF THE INVENTION

1. Field of the Invention

This invention is in the field of animal leashes and leads.

2. Discussion of the Background

A discussion of the background for this invention may be found in U.S. Pat. No. 5,361,726, which discloses an animal leash comprising a dual-loop lead and carabiner. In that patent, the advantages of using a carabiner as the attachment means for an animal leash are discussed at length. These advantages include the strength and durability of a carabiner, the large inner area circumscribed by the carabiner, the ease of manipulation of the carabiner, and the multiplicity of configuations that a leash may have when using a carabiner as the attachment means.

These advantages also accrue to a leash in which the carabiner is replaced by a snap link which is designed more specifically for an animal leash and other similar light-duty applications. Specifically, the snap link disclosed herein incorporates a straight portion appropriate for secure attachment of the strap material from which the lead is made. U.S. Pat. No. 5,361,726 discloses a leash having a hand-hold loop at each end, whereby a carabiner can be placed through either or both loops, or detached entirely if the lead is to be cleaned or replaced. While there are advantages associated with that type of design, there are other different advantages associated with a design in which a snap link is attached more securely to one end of the leash.

The advantages of the present invention are described in more detail in the following sections.

SUMMARY OF THE INVENTION

The leash disclosed herein is a simple construction comprising two to four elements.

The first element is a lead made of a flat strap of woven nylon or strapping leather or the like. The lead can be any convenient length. Dog leashes are typically four to six feet long. Longer leads may be more desirable for controlling larger animals such as llamas, horses, or cattle. Longer leads are also appropriate for dogs in certain situations, such as police dogs working in a search and rescue capacity.

The second element is a snap link, which is a link made of aluminum in which one side of the link, called the gate, may be pivoted inward about a hinge in order to place a collar ring or collar or strap into the snap link. The hinge is spring-loaded, so that the gate of the snap link is normally closed. Snap links can be manufactured in various sizes. Three sizes appropriate for animal leashes are disclosed herein. The particular snap links illustrated are made from aluminum rod formed into a modified oval having a long outside dimension of two to four inches and a short outside dimension of one to two inches, with a material diameter of one-quarter to three-eighths inch. The material of choice in this application is aluminum, which gives the attributes of light weight, strength, and corrosion resistance. The modified oval shape of the snap link used in the preferred embodiment incorporates a short straight portion in the part of the snap link around which the lead material is looped and sewn. This configuration is designed specifically for advantageous use with a flat strap of lead material.

The snap link geometry disclosed herein contrasts with the designs found in mountaineering carabiners and snap links for more general use. Prior art snap links (including carabiners) are found in oval, D-shaped, and open figure-eight geometries. These geometries are intended primarily for enclosing rope. Moreover, D-shaped snap links are designed for maximum axial strength when used with rope. Attaching a flat lead securely to a prior art snap link for a leash application has shortcomings in that the lead material may be bunched up or wrinkled, or the lead material at the point of attachment may not be colinear with the direction of the pulling force on the leash. The straight attachment portion and other geometric features of the snap link disclosed herein eliminate these shortcomings.

In the invention of this disclosure, the snap link is securely attached to one end of the lead by looping the lead material around the short straight portion of the snap link and placing stitches close to the snap link. Attaching the lead securely to the snap link offers advantages which are not present in the invention of U.S. Pat. No. 5,361,726. In particular, with the snap link shape disclosed herein, the lead material may be sewn close to the snap link without wrinkling or stressing the lead material. Close stitching prevents the unintentional removal and possible loss of the snap link. However, removal of the snap link is still possible should the lead need to be replaced or cleaned. The closely-sewn configuration also tends to make the snap link even easier to manipulate, and reduces bouncing of the snap link when it is around the collar of an animal which is moving with a rapid gait.

Another design feature incorporated into the snap link of the present invention is the mating surfaces of the body and gate. This design feature eliminates the possibility of snagging the hook end of the body when the snap link is attached to or detached from a collar. This problem can occur when using a mountaineering carabiner in the leash application.

If the other end of the leash is fashioned into a hand-hold loop, the leash has the advantage of multiple configurations. In the long leash mode, the snap link is attached to the collar and a person grasps the loop at the other end of the leash. In the short-leash mode, the hand-hold loop is placed through the snap link, and the person grasps the lead at its midpoint. There is additionally an ultra-short mode which may be effected by also placing the midpoint of the lead through the snap link.

If the other end of the leash has a snap link sewn tightly to it in a fashion similar to the first end, a leash appropriate for law enforcement use is created. This leash usually has a long lead. One end is attached to a dog's collar or harness, and the other end is attached to a law officer's belt. This arrangement is especially appealing to officers who work with bloodhounds in scent-tracking work.

A variant of the dual-snap link leash has a short lead with a snap link at each end. This leash is handy for use in grooming parlors, kennels, and veterinary hospitals. One end can be quickly attached to the collar and the other end can be quickly attached to a fixed hook or loop, thereby tethering the animal.

If the other end of the leash has a stop (usually rubber) sewn onto it, an excellent horse lead results. It is not appropriate to put a hand hold loop in the end of the leash for this application because injury can result if a person's hand is caught in the loop when a horse becomes unruly.

It may be desirable to incorporate a swivel into the lead near where the snap link is attached. A swivel prevents twisting of the lead if an animal is circling the handler.

The leash disclosed herein is extraordinarily easy to use. As in the invention disclosed in U.S. Pat. No. 5,361,726, the snap link need not be attached to a metal ring on the animal's collar or halter; rather, it can be very quickly and easily attached around the strap material of the collar or halter. This makes attachment to the animal much simpler, particularly if the animal happens to be in an excited or uncooperative mood. A snap link by its nature is easier to manipulate than the smaller clips used in prior art leashes. Opening and closing the device is a very easy and natural motion. The ease of use for the device is an advantage to anyone, but it is particularly advantageous to a person with a physical disabilty such as arthritis or poor eyesight. The snap link is also the preferred device in cold weather, since it can be easily manipulated by a gloved hand.

Another attribute of the leash disclosed herein is the ease and convenience with which it can be stowed, hands-free, on the body of a person for periods when it is desired to let the animal run free. The user simply places both lead loops into the snap link and slings the leash over one shoulder bandolier-style.

It is apparent from the foregoing, therefore, that the large size of the snap link relative to the metal clips used in prior art leashes is a central attribute of the invention because it permits numerous loops of the lead strap, together with the strap of the collar or halter, to be quickly and easily linked together. Such versatility and ease of use is not possible with prior art leashes.

A nylon lead and aluminum snap link provide a leash of unparalleled durability. For all intents and purposes, a snap link used in the application described herein, namely an animal leash, will never wear out, break, or fail in any way. The nylon strap used in the preferred embodiment of the invention is also an extremely strong and durable material for this purpose.

BRIEF DESCRIPTION OF THE DRAWINGS

FIG. 1 shows three different sizes of modified oval snap links.

FIG. 2 shows a snap link in the open position, and shows the method of attachment of the lead.

FIG. 3 shows detail of the ridge-and-groove features in the hook end termination and gate mating end.

DETAILED DESCRIPTION OF THE PREFERRED EMBODIMENT

Figure 4:
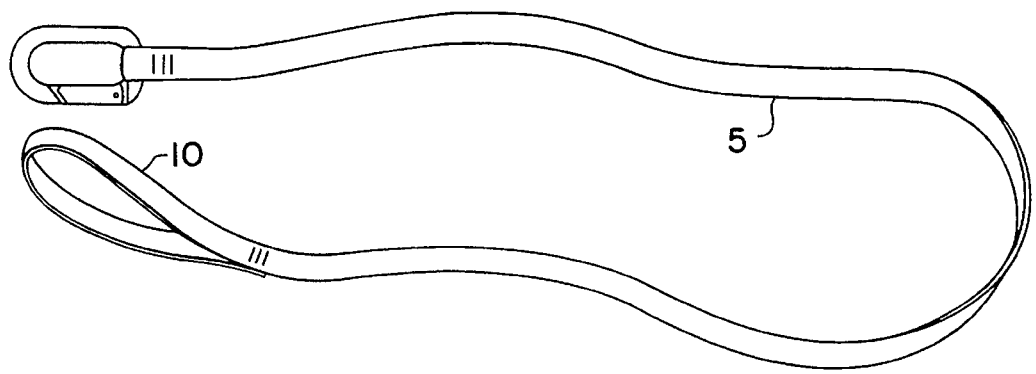
FIG. 4 shows a completed leash with a hand-hold loop in one end.

In FIG. 1, three sizes of a snap link designed specifically for an animal leash are shown. The large size is appropriate for large dogs or other large animals. The middle size is appropriate for medium-sized dogs. The small size is appropriate for cats and small dogs. The parts of a snap link are the body (comprising elements 1, 4, and 7), the gate 2, and the hinge pin 3. The snap link also includes a coil spring and a spring stop pin, which are located in a pocket in the gate located axially and eccentrically upwards from the hinge location. These design elements provide the spring action of gate closure, and are standard in the design of carabiners. Therefore, they are not pictured here.

The body and gate of the snap link are generally made of aluminum, which combines the attributes of strength, light weight, and corrosion resistance. FIG. 1 includes a scale to show the sizes of the snap links appropriate for the large, medium, and small leashes. The large snap link can be formed from round aluminum rod having ⅜-inch diameter. The medium snap link can be formed from round aluminum rod having 5/16-inch diameter. The small snap link can be formed from round aluminum rod having ¼-inch diameter.

The modified oval shape of the snap links in FIG. 1 incorporates a semicircular hook end 7, the straight sides formed by the gate 2 and the body spine 1, and a straight attachment end 4, which forms right angles with the straight sides formed by the gate and body spine. This distinguishes the snap link of the present invention from D-shaped snap links (including carabiners), which sometimes incorporate a straight or nearly straight portion between the gate and the spine. In a D-shaped snap link, however, the straight portion forms an acute angle with the spine and an obtuse angle with the gate. This is because a D-shaped snap link is intended primarily for use with rope, and the overriding design criterion, particularly in mountaineering use, is strength. The axial pull imparted to a D-shaped snap link engaged between two lengths of rope will be borne primarily along the spine side (strong) rather than along the gate side (relatively weak).

The snap link described herein is designed for use with flat strap. The lead material 5, in the form of a flat strap, is wrapped around the straight attachment end and sewn closely, as shown in FIG. 2. The stitching 6 is placed close enough to the snap link to constrain the lead material to its intended position during normal use. However, the stitching is generally located such that the snap link may be intentionally removed by working the lead around the body and off at the termination of the hook end 7. Therefore, the snap link may be removed for sufficient reason; for example, if the lead should become damaged and a new lead is to be substituted. The large snap link is designed for use with one-inch wide lead material. The medium snap link is designed for use with ¾-inch wide lead material, and the small snap link is designed for use with 9/16-inch wide lead material.

The right-angle relationship of the straight attachment portion to the two straight sides ensures that the axial pull on the lead is colinear with the lead at the point of attachment. The semicircular hook end also helps to ensure this colinearity. The straight portion also ensures that the load will be borne equally across the width of the lead material at the point of attachment. If a D-shaped snap link were used instead, the axis of the lead material at the point of attachment would be at an angle to the pull force. As a result, the attachment loop in the lead would have a tendency to slide around from the straight portion and into the acute-angle corner formed with the spine, thereby defeating the intention of wrapping the flat strap around a straight portion of the snap link. If an oval snap link were used instead, the pull force would not be evenly distributed across the width of the strap; rather, the pull force would be disproportionately borne along the outer edges of the strap, and the strap would have a tendency to bunch or wrinkle at the point of attachment.

Shown in FIG. 3 is the detail of the mating surfaces of the gate 2 and the hook end 7. The hook end termination is formed at an angle to the central axis of the body material (also clearly seen in FIG. 2). Further, the mating end of the gate is formed at the corresponding angle. The hook end termination incorporates a ridge 8 which engages in a groove 9 in the mating end of the gate when the snap link is in its normal closed position. This ridge-and-groove closure prevents side-to-side movement of the gate when the snap link is closed. Moreover, the hook end design shown in FIGS. 2 and 3 permits the open snap link to be easily slipped on or off a collar without catching. This design is an improvement over using a mountaineering carabiner, as was disclosed in U.S. Pat. No. 5,361,726. The mountaineering carabiner includes a notch in the hook end that engages a pin in the mating end of the gate. The pin-and-notch design of the mountaineering carabiner closure is a safety feature required to impart maximum strength. Such a strength requirement is not present in the leash application. For the leash application, a snap link design that maximizes ease of use is more appropriate.

FIG. 4 shows a completed leash with a hand-hold loop 10 sewn into one end. This leash can be shortened to half-length by placing the hand-hold loop through the snap link, which is a feature of previous U.S. Pat. No. 5,361,726.

Figure 5:
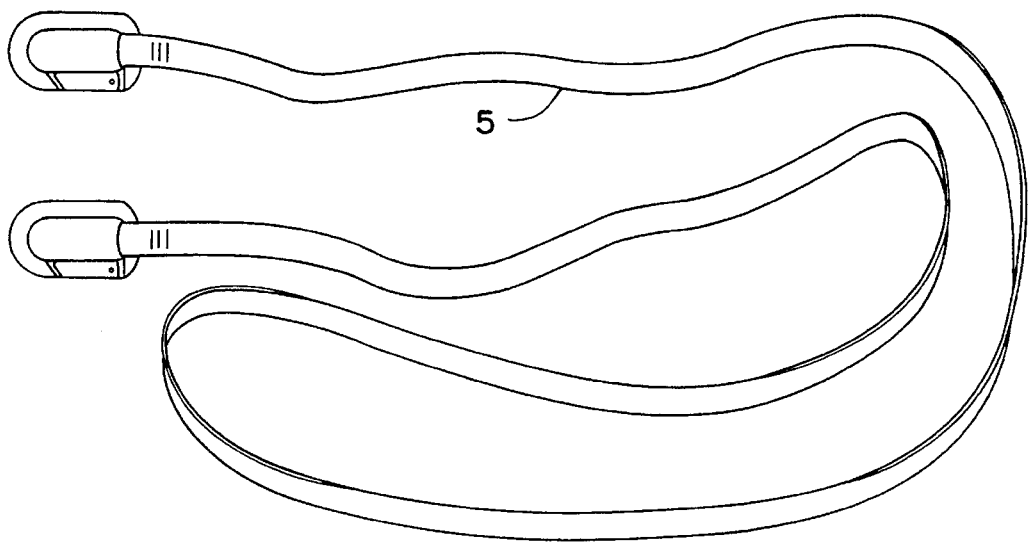
FIG. 5 shows a completed leash with a snap link sewn to each end.

FIG. 5 shows a leash with a snap link sewn into each end. This is a special applications leash. In kennels and grooming parlors, this leash is useful with a standard-length (or shorter) lead. One end is attached to a collar, and the other end is attached to a fixture of some type. Thus, an animal can be quickly and easily tethered. The dual-snap link leash with a long lead is popular with handlers of dogs used in search-and-rescue work, such as blood-hounds. One end of the leash is attached to the dog's harness, and the other end is attached to the handler's belt or other part of his apparel. This frees the hands for other activities. The ease of manipulating the snap links with gloved hands is especially valuable in this application, since a handler and his dog often work long hours in all kinds of weather.

Figure 6:
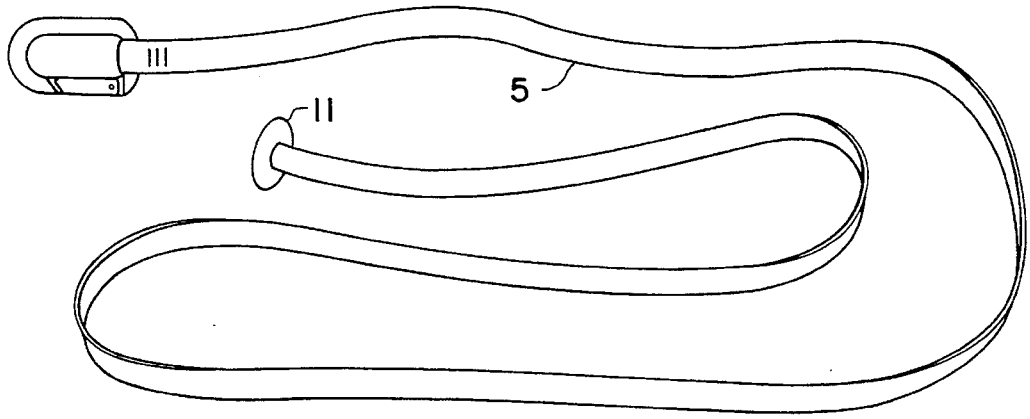
FIG. 6 shows a completed leash with a hand-hold plug in one end.

FIG. 6 shows a leash that is appropriate as a lead for large animals such as horses. A plug 11 is substituted for the hand-hold loop so that the handler's arm cannot be caught and pulled violently if the animal jerks or pulls away.

Figure 7:
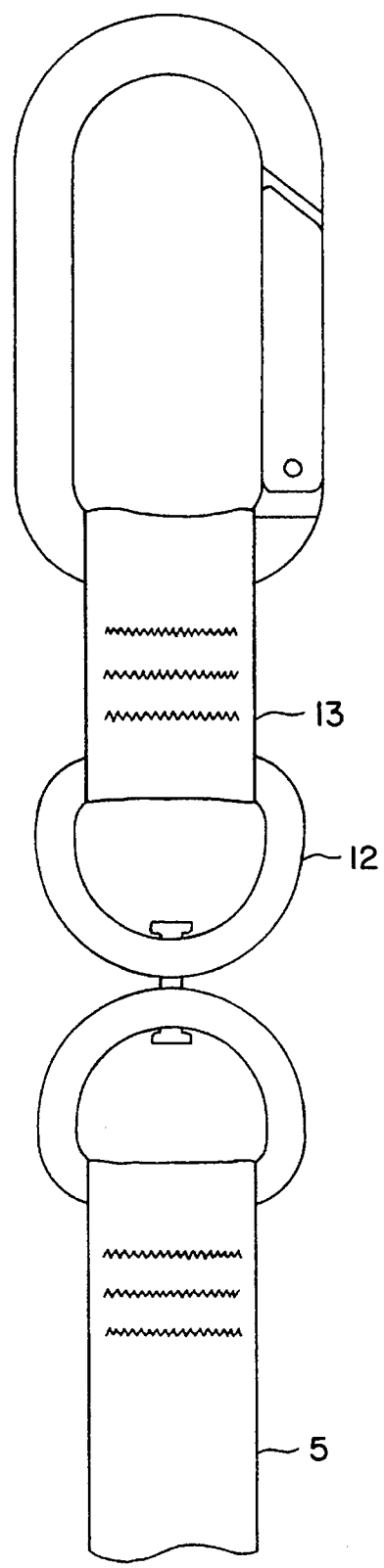
FIG. 7 shows a swivel incorporated into the lead near where it attaches to the snap link.

FIG. 7 shows the detail of how a swivel 12 may be incorporated into the end of the leash. A short piece of lead material is used to make a loop 13 to couple the swivel to the snap link. A swivel may be appropriate for certain applications such as a lunge line for horses or a lead for bloodhounds. The swivel prevents the lead from becoming twisted if the animal is circling the handler.

Modifications to the preferred embodiment can be made without departing from the scope and teachings of this specification. For example, the hook end 7 need not be semicircular in shape. As an alternative, the hook end could be made to match the shape of the attachment end, resulting in a snap link having a rectangular shape. This shape is generally not as good as the preferred embodiment, however, because the semicircular hook end ensures that the pulling force imparted on the hook end will be colinear with the lead.

Another modification which could be made is to change the two angles between the straight attachment portion and the straight sides to some value other than 90 degrees. As long as the two angles are equal, the pull force will be colinear with the axis of the lead at the point of attachment. Moreover, the two angles may be made slightly unequal without great sacrifice to the colinearity of force and lead axis. It may be desirable to make both angles slightly obtuse in order to create a larger enclosed area in the link. In general, however, the right angles are preferred because the resulting snap link body is easy to form and is visually pleasing.

What is claimed is:
1. An animal leash comprising:
a snap link made of a suitably strong and rigid material formed into a modified oval which includes two straight sides, a hook end, and an attachment end, said attachment end including a straight portion which makes equal angles with said straight sides, said snap link comprising:
a body which forms the hook end, the attachment end, and one of the straight sides; and
a gate which forms the other straight side, said gate being attached to the body by a spring-loaded hinge, whereby the gate is normally held in a closed position such that the snap link forms a closed link, and further whereby the gate may be opened by hand by pivoting the gate into the inner portion of the snap link oval; and
a lead of flexible strap attached to said attachment end by an attachment loop in one end of said lead which encloses said attachment end, said attachment loop being secured by stitching in the lead material, or other suitable means.

2. The leash of claim 1 wherein said equal angles between the straight portion of the attachment end and the two straight sides are right angles.

3. The leash of claim 1 wherein the other end of said lead is formed into a hand-hold loop suitable for grasping in a person's hand, said hand-hold loop being secured by stitching in the lead material, or other suitable means.

4. The leash of claim 1 wherein the other end of said lead incorporates a second attachment loop as described in claim 1 which attaches to a second snap link having the features described in claim 1.

5. The leash of claim 1 wherein the other end of said lead attaches to a plug which is appropriate for grasping in hand, whereby a leash for handling large animals results.

6. The leash of claim 1 which further incorporates a swivel located in the lead near the attachment loop to the snap link.

7. The leash of claim 1 wherein the hook end of said snap link is semicircular in shape.

8. The leash of claim 1 wherein
the hook end of said snap link body has its termination formed at an angle to the central axis of the body material; and
said termination includes a ridge oriented parallel to the plane of the snap link oval; and
the mating end of the gate which mates with the hook end termination upon snap link closure is formed at an angle corresponding to the angle of the hook end; and
said gate mating end includes a groove oriented parallel to the plane of the snap link oval;
whereby said ridge is engaged in said groove when the snap link is closed, so as to result in an assembly which prevents side-to-side movement of the gate when the snap link is closed.

9. The leash of claim 1 wherein the snap link body and the snap link gate are made of aluminum.

10. The leash of claim 1 in a large size, wherein
the snap link gate and the snap link body are made of aluminum having a circular cross-section with a diameter of approximately ⅜ inch; and
the hook end is semicircular in shape; and
said straight portion makes right angles with said two straight sides; and
the height of the snap link oval from the outside of the straight attachment end to the outside of the hook end is approximately 3⅜ inches; and the width of the snap link oval from the outside of one straight side to the outside of the other straight side is approximately 1⅞ inches; and the width of the lead strap is approximately one inch.

11. The leash of claim 1 in a medium size, wherein the snap link gate and the snap link body are made of aluminum having a circular cross-section with a diameter of approximately 5/16 inch; and the hook end is semicircular in shape; and said straight portion makes right angles with said two straight sides; and the height of the snap link oval from the outside of the straight attachment end to the outside of the hook end is approximately 2⅝ inches; and the width of the snap link oval from the outside of one straight side to the outside of the other straight side is approximately 1½ inches; and the width of the lead strap is approximately ¾ inch.

12. The leash of claim 1 in a small size, wherein the snap link gate and the snap link body are made of aluminum having a circular cross-section with a diameter of approximately ¼ inch; and the hook end is semicircular in shape; and said straight portion makes right angles with said two straight sides; and the height of the snap link oval from the outside of the straight attachment end to the outside of the hook end is approximately 2 inches; and the width of the snap link oval from the outside of one straight side to the outside of the other straight side is approximately 1⅛ inches; and the width of the lead strap is approximately 9/16 inch.

\* \* \* \* \*